US006839572B2

(12) United States Patent
Erhage et al.

(10) Patent No.: US 6,839,572 B2
(45) Date of Patent: Jan. 4, 2005

(54) CONTROL DEVICE FOR A SUBSYSTEM IN A BASE STATION FOR MOBILE TELEPHONY

(75) Inventors: Lars Erhage, Göteborg (SE); Leif Spaander, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 513 days.

(21) Appl. No.: 10/073,121

(22) Filed: Feb. 12, 2002

(65) Prior Publication Data

US 2002/0132641 A1 Sep. 19, 2002

(30) Foreign Application Priority Data

Feb. 12, 2001 (SE) .............................................. 0100427

(51) Int. Cl.[7] ................................................. H04B 1/38

(52) U.S. Cl. ................... 455/561; 455/562.1; 455/121; 455/73; 455/424; 342/383; 342/266

(58) Field of Search ......................... 455/90.1, 91, 560, 455/561, 562.1, 575.7, 550.1, 428.1, 430, 424, 121, 186.1, 334, 73; 342/383, 368

(56) References Cited

U.S. PATENT DOCUMENTS 4,216,475 A * 8/1980 Johnson ....................... 342/373
4,752,969 A * 6/1988 Rilling ..................... 455/278.1
5,799,250 A * 8/1998 Veloso et al. ............ 455/422.1
5,917,447 A 6/1999 Wang et al.
5,930,722 A * 7/1999 Han et al. .................... 455/561
6,188,913 B1 2/2001 Fukagawa et al.
6,198,925 B1 * 3/2001 Lee ............................ 455/434
6,522,898 B1 * 2/2003 Kohno et al. ............ 455/562.1
6,628,969 B1 * 9/2003 Rilling ........................ 455/561

FOREIGN PATENT DOCUMENTS

EP 0150997 A2 10/1992

* cited by examiner

*Primary Examiner*—David Hudspeth
*Assistant Examiner*—Kamran Afshar
(74) *Attorney, Agent, or Firm*—Nixon & Vanderhye P.C.

(57) ABSTRACT

The invention relates to a control device for a transmitter/receiver module in an antenna for receiving and transmitting electromagnetic signals, which transmitter/receiver module can be set to different settings with regard to the phase angle of the transmitted/received signal and at least one additional transmission/reception function. The control device comprises means for generating control pulses, and a plurality of storage means that can be activated and controlled by the control device, and in the storage means control information for the module's different functions is stored in different groups in order to be able to generate different states of the module. The storage means also contain information about the identity of each storage means, the number of times that the states according to the groups in the storage means are to be assumed, and which storage means is to be activated thereafter. By means of the invention, flexible control of transmitter/receiver modules is achieved, with a low requirement for data transmission in real time.

13 Claims, 5 Drawing Sheets

CONTROL DEVICE FOR A SUBSYSTEM IN A BASE STATION FOR MOBILE TELEPHONY

TECHNICAL FIELD

The present invention relates to a control device for a subsystem in equipment for transmission and/or reception of electromagnetic signals, for example base stations for mobile telephony. By means of the invention, flexible control of one or more subsystems in the equipment is achieved, with a low requirement for data transmission in real time. A subsystem in a base station for which the invention is particularly suitable is electrically controllable antennas, the invention being used to control the transmitter/receiver modules in the antenna. The invention can also be used in other types of equipment that utilize electrically controlled antennas, for example radar systems.

BACKGROUND ART

Within, for example, base stations for mobile telephony, there is often a requirement to be able to control the various subsystems in the base station rapidly and flexibly in real time, which places great demands on the amounts of data that have to be transmitted from a control unit in the base station to the various subsystems. These great demands on the transmission of data in real time occur, in principle, in all the subsystems in the base station, but will be illustrated below based on the need that arises if a base station utilizes so-called active electrically controlled antennas.

An active electrically controlled antenna usually comprises a large number of so-called transmitter/receiver modules, where, in principle, each module is a separate antenna that is controlled individually with regard to amplification and phase, so that the required antenna pattern for the whole of the electrically controlled antenna is obtained. The control is usually carried out by each module receiving information from an external control unit concerning the direction that the main lobe of the antenna should have, after which a calculation is carried out in the module concerning the settings, for example phase, that the module is to have in order to give the required direction.

In future systems, the requirement to be able to use antennas for additional functions will increase. This is particularly evident within telecommunication applications, such as base stations for mobile telephony, where the requirement can be foreseen that, in addition to traditional transmission and reception, the antennas will have to be able to be used for other applications, for example for finding the direction of sources of interference in order to be able subsequently to neutralize the effects of these. Another function for which there could possibly be an increased requirement in the future is the ability to concentrate the transmission to certain areas by shaping the antenna pattern in a particular way, by using so-called lobe shaping.

One of the difficulties in achieving a system with the characteristics of flexibility and rapid combination of different functions can be illustrated by the following calculation: An electrically controlled antenna with 1000 transmitter/receiver modules is to be controlled in such a way that it changes the direction of its main lobe in a microsecond. If 6 bits are needed for the phase setting of each module, the transmission speed that is required will be 1000*6*1000000=6 Gbit/second, which is a transmission speed that is so high that it will be expensive and difficult to implement. Additional functionality of the transmitter/receiver modules, and a rapid and flexible use of these, would demand even higher transmission speeds, and thereby result in even higher costs.

Regarding active electrically controlled antennas in an application other than mobile telephony, namely radar systems, there could be requirements that, in addition to handling traditional radar functions, the antenna should also be able to be used for listening, communication and interference functions. In order to make possible an effective utilization of the radar equipment, a rapid combination of these different functions must be possible, which can be extremely complex, as each of the different functions has itself a high degree of complexity. An additional requirement concerning the control of a system with a plurality of different functions is that it should be flexible, in order to enable it to have the potential for development and modification based on future user requirements.

U.S. Pat. No. 5,917,447 describes an electrically controlled antenna according to known technology, which requires a special calculation algorithm on account of the complexity of the control of the device.

DISCLOSURE OF INVENTION

There is thus a need to be able to control a subsystem in a base station for mobile telephony, which subsystem can be set to different settings with regard to at least two different functions, in a way that minimizes the need for data transmission while at the same time allowing a high degree of flexibility regarding the possibility of switching the subsystem between different functionalities.

This need is fulfilled according to the present invention by the provision of a control device for a subsystem in a base station for mobile telephony, which subsystem can be set to different settings with regard to at least two different functions, the control device comprising means for generating control pulses, and the control device comprising a plurality of storage means which can be activated and controlled by the control device. Control information for the different functions of the module is stored in the storage means in different groups which can generate different states in the module, the storage means also containing information about the identity of each storage means, the number of times the states according to the groups in the storage means are to be assumed, and which storage means is to be activated thereafter.

By storing the control information for different states in the transmitter/receiver module in groups in the storage means in accordance with the invention, and also storing information about how many times the different groups are to be used, it is possible to switch the module between the states that are generated by the different groups just by the use of control pulses, by providing the module with instructions to go from one group to the next via the control pulses. This reduces greatly the amount of information that needs to be transmitted in real time.

As a plurality of storage means are used according to the invention, the control information can be transmitted from a central unit for storage in a first storage means, while the information in a second storage means is being used to control the module in question, which means that the information that is transmitted to the first storage means does not need to be transmitted in real time, and thus does not place the same high demands on the transmission speed. In addition to reducing the requirement for transmission speed, this procedure also gives a high degree of flexibility regarding the control of the modules, as the control information in the storage means can easily be changed, again without this needing to be carried out in real time.

The invention also relates to a method for using a device according to the invention.

The invention can also be applied to a control device for a transmitter/receiver module in an antenna for receiving and transmitting electromagnetic signals, where the transmitter/receiver module can be set to different settings with regard to the phase angle of the transmitted/received signal and at least one additional transmission/reception function.

BRIEF DESCRIPTION OF DRAWINGS

The invention will be described below in greater detail, with reference to the attached drawings, in which.

MODES OF IMPLEMENTING THE INVENTION

The invention can, in principle, be used on any subsystem in a base station, and also on subsystems in other types of equipment that require rapid and flexible control in real time, for example radar stations, which will be used as an example in the following text.

Figure 1:
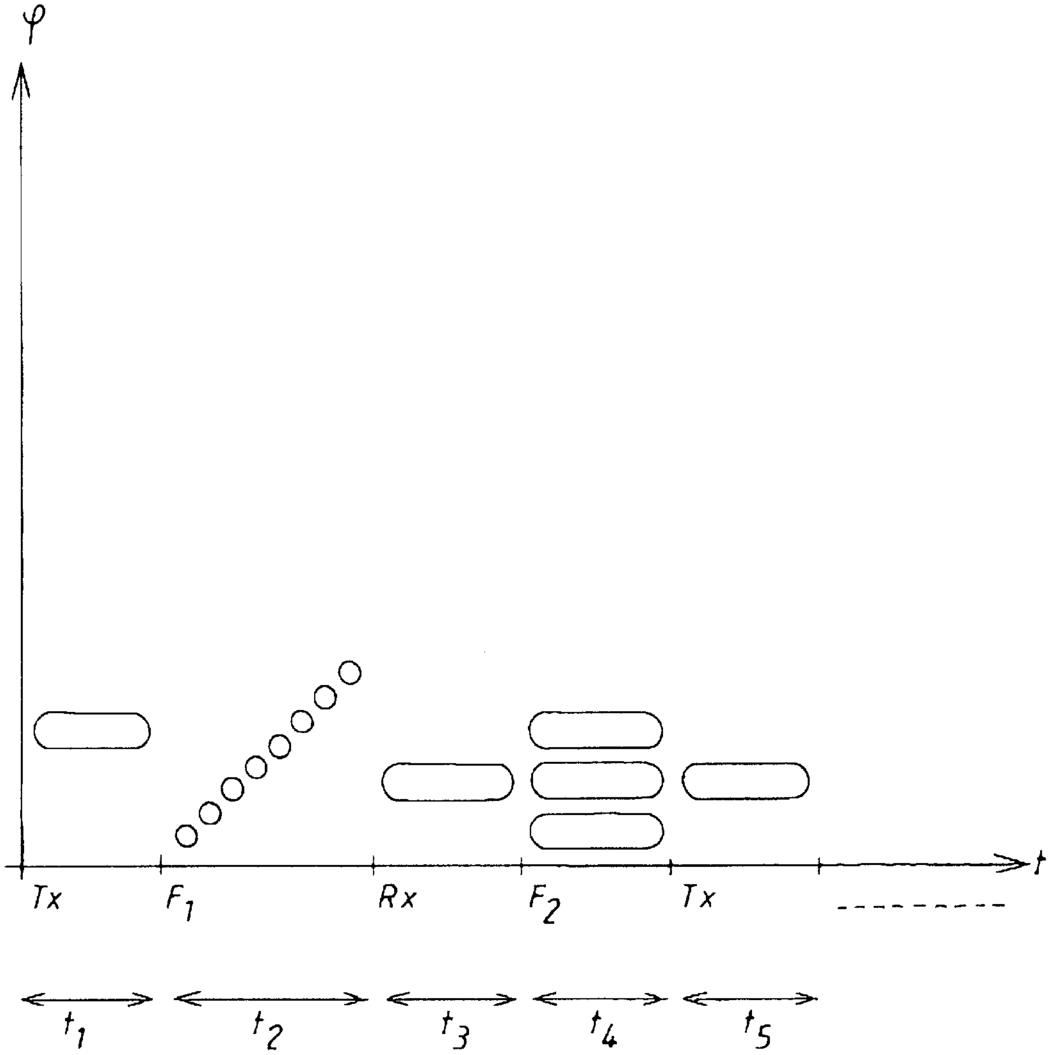
FIG. 1 shows examples of different functions of an antenna.

The subsystem that is shown in FIG. 1, which will be used throughout to describe the invention, is a so-called active electrically controlled antenna in a radar. This antenna comprises a large number of transmitter/receiver modules that are controlled with regard to amplitude and phase of the module's transmitted/received signals, in order to give the combined antenna the required antenna pattern.

FIG. 1 shows various possible functions of the active electrically controlled antenna in a radar system. The antenna in FIG. 1 sends (Tx) a radar pulse during a first interval $t_1$ in a certain direction $\Phi$. If approximate information is available—for example from previous measurements—concerning the distance to the target or targets that are being sought, it is also known approximately when the transmitted pulse should come back, and thus when the antenna needs to be switched over for reception of the transmitted pulse. This means that the antenna can be used for other functions in the interval between transmission and reception, in FIG. 1 shown by an interval $t_2$, during which the lobe direction $\Phi$ of the antenna is changed, and the antenna is used for the function $F_1$, which can, for example, be passive listening for other types of signal, or transmission of interference. After the interval $t_2$, the antenna is switched over, with a reset lobe direction, during an interval $t_3$, to reception (Rx) of the echo from its own signal that was transmitted during the interval $t_1$. After $t_3$, the antenna can be used for yet another function $F_2$ during an interval $t_4$, during which the antenna can be given a plurality of different main lobes, in other words the antenna can be used as a so-called multi-lobe antenna.

In other words, in principle, the antenna in FIG. 1 can be used for a large number of different functions during an unlimited length of time, which imposes great requirements for a flexible, rapid and simple control of the transmitter/receiver modules that are incorporated in the antenna.

Figure 2:
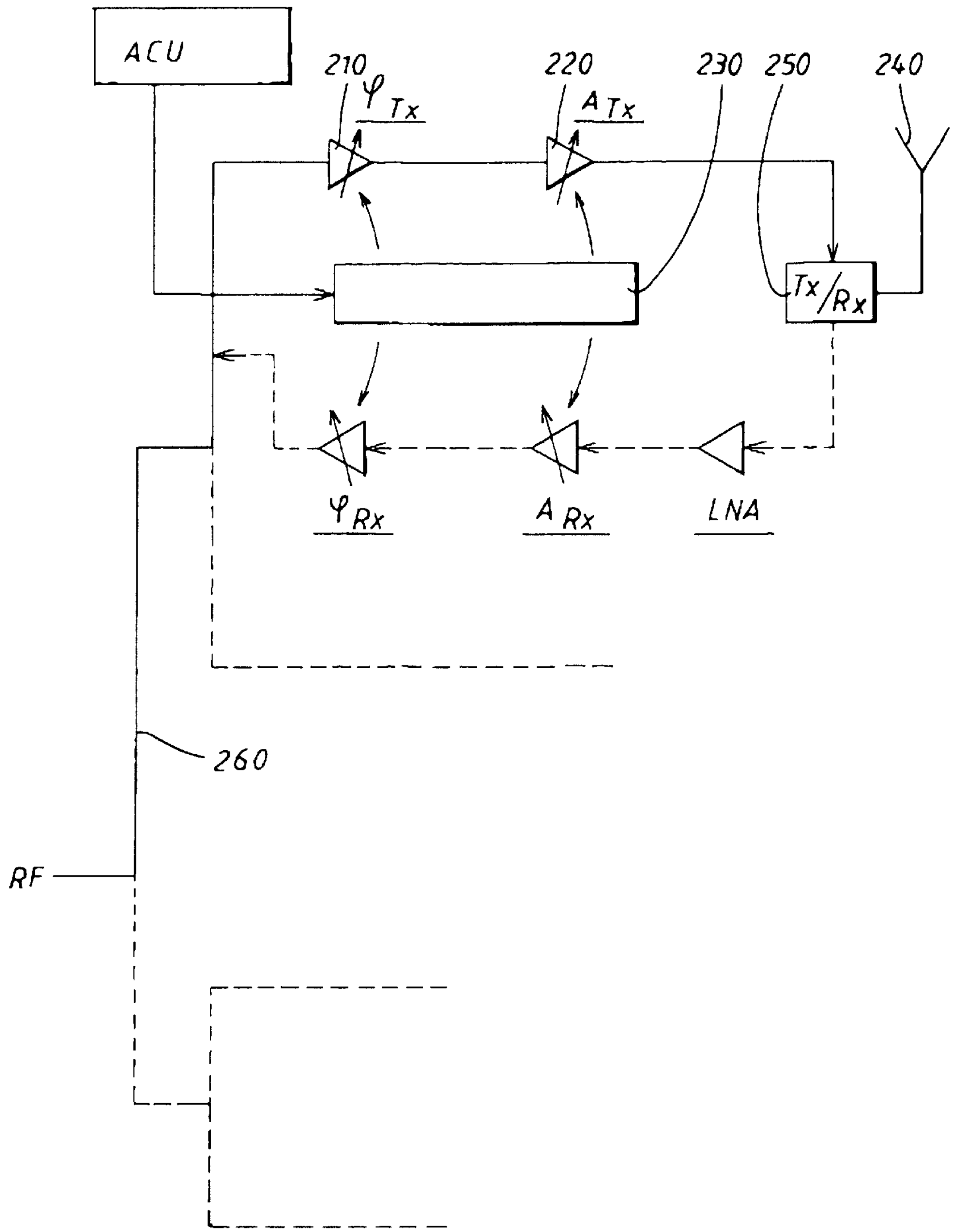
FIG. 2 shows the construction of a transmitter/receiver module in an antenna.

FIG. 2 shows schematically, among other things, the construction of a transmitter/receiver module incorporated in an antenna of the type that is used for the antenna functions in FIG. 1, and a control device 230 according to the invention. The module comprises a phase shifter 210 and an amplifier 220, which means that it can be controlled with regard to phase and amplitude of the transmitted signal, and also comprises a radiating element 240. As indicated by the broken lines, the combined antenna consists of a large number of transmitter/receiver modules of the type shown in FIG. 2, and the signal RF transmitted by the modules comes from another unit, for example a unit for A/D conversion, via a branching network 260.

The combined antenna, constructed of transmitter/receiver modules similar to the one in FIG. 2, will have an antenna pattern that consists of the total of the antenna patterns of the modules that are incorporated in the antenna, which means that the combined antenna pattern can be controlled by controlling the modules with regard to their phase and amplitude settings. In order to make this control as simple, flexible and rapid as possible, it is carried out according to the invention via a control device 230 which controls the module with regard to the abovementioned parameters, in other words phase and amplitude of the transmitted signal. A control device 230 according to the invention will be described here briefly and will be described in greater detail below, in connection with FIG. 3.

The signal RF transmitted by the modules comes, as mentioned, from a feed network, and the information concerning required settings for each transmitter/receiver module comes from a central antenna control unit, called an ACU, Antenna Control Unit, in FIG. 2. The ACU sends information to each module's control device 230 according to the invention regarding the required overall antenna pattern, after which the control device regulates the phase and amplitude of the signal transmitted by the module in such a way that the required overall antenna pattern Is attained Another possible solution is that the ACU sends information to each module's control device concerning the settings for the module, and that the control device quite simply implements these settings in the module.

In connection with FIG. 2, the modules have only been described as used for the transmission of signals, but usually one and the same module can be used for both reception and transmission. In order to achieve this, there should be a transmitter/receiver change-over switch (Tx/Rx) 250 between the module 200 and the radiating element 240, the transmitter/receiver change-over switch being set in accordance with the required function of the module, transmission or reception. The same phase shifter and amplifier can be used for both transmission and reception, and it necessary a low noise amplifier, LNA, may be required for the reception function, normally connected between the transmitter/receiver change-over switch and the ordinary amplifier in the module. In FIG. 2, such a transmitter/receiver change-over switch is shown, and the reception function has been shown by broken lines in order to indicate its existence. Of course, the module can also have separate components, such as phase shifters and amplifiers (shown in FIG. 2) for transmission and reception without affecting the concept of the invention.

Figure 3:
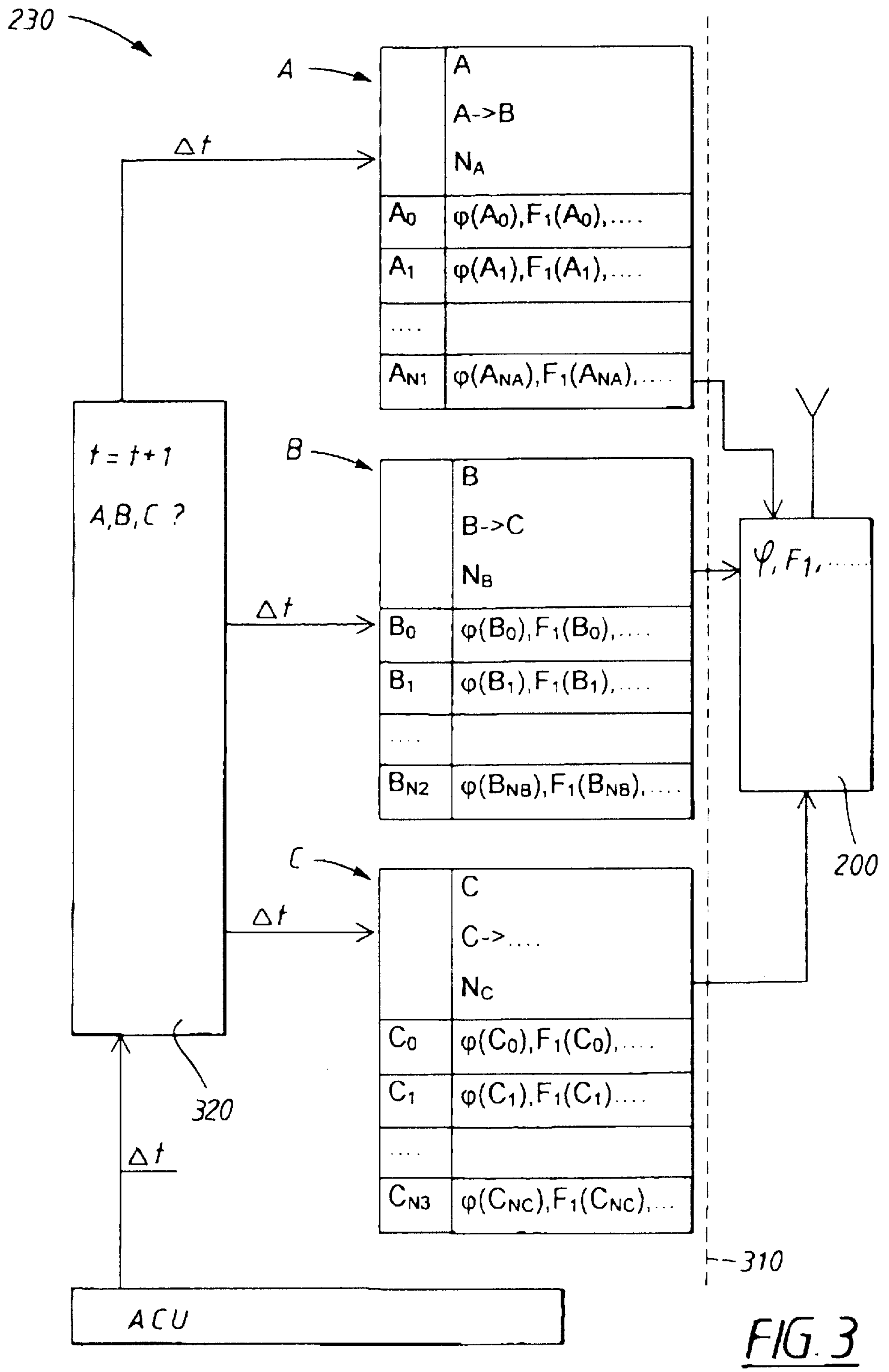
FIG. 3 shows in greater detail the construction of a control device according to the invention.

FIG. 3 shows in greater detail an example of a control device 230 according to the invention, and a module 200 that is controlled by the device, the module 200 and the control device 230 having been separated in FIG. 3 by a broken line 310, in order to clarify the distinction between them. The module 200 in question can be controlled with regard to three different functions, namely amplification and phase of the transmitted/received signal and setting. The term setting is understood to mean transmission or reception. The number of functions and the precise functions that are described here are only to be regarded as examples. In principle, a control device according to the invention can control a module with any number of any type of functions.

The control device 230 according to the invention comprises a plurality of storage means A, B, C, which can be activated and controlled by means 320 in the control device. In the storage means control information for the different functions of the module is stored in different groups $A_0$, $A_1$, $A_2$, . . . $A_{N1}$, $B_0$, $B_1$, $B_2$, . . . $B_{N2}$, $C_0$, $C_1$, $C_2$, . . . $C_{N3}$, where each group will generate a particular state of the module with regard to the module's different characteristics and functions $\Phi$, $F_1$ . . . $F_N$. In addition, the storage means contain information about the identity of each storage means A, B, C, the number of times $N_A$, $N_B$, $N_C$ that each state generated by the groups is to be assumed, and which storage means, A, B or C, is to be activated after the storage means in question.

In addition, the control device 230 comprises means 320 for generating control pulses to the storage means, normally in the form of clock pulses At which are received from the abovementioned ACU, where each clock pulse means that the next group in the storage means is activated and is sent as instructions to the module. In FIG. 3, the means for generating control pulses has been shown as the same unit as the means for activating and controlling the storage means, which is only to be regarded as an example.

When the number of times that the states according to the current storage means have been assumed agrees with the respective pre-stored value $N_A$, $N_B$, $N_C$, the information about which storage means is to be activated next will be used in order to activate this storage means and to use its groups in a corresponding way. Checking whether the number of times agrees with the pre-stored value can be carried out in a number of different ways. The activation device 320 can, for example, quite simply count the number of times the groups in the control device A, B, C, in question have been assumed and compare this with the limit value. Alternatively the storage means can contain information about the number of groups and the number of clock pulses that the storage means is to use. The latter alternative could, for example, mean that a storage means contains information to the effect that the storage means is to be used 1024 times, and that there are two groups in the storage means, which, taken as a whole, would mean that the storage means is to be run through 512 times (1024/2=512).

In other words, by means of the invention, it is made possible for the central unit, the ACU, to control the states in the different modules in real time just by sending out clock pulses to the control device, which considerably reduces the amount of data that needs to be transmitted in real time from the ACU. At the same time, the ACU can, in an extremely simple way, control what states will be assumed in the different intervals of time by changing the content in the different storage means, which can be carried out by the content in one storage means being changed at the same time as one or more other storage means are being used for controlling the module. This is shown schematically by means of an example in FIG. 4, where the ACU first stores all the groups in the storage means A ("load A") and thereafter executes the states in these groups ("Run A").

At the same time as the groups in A are being executed, the groups in the storage means B are stored, which can be carried out at a slower rate than the execution of A, as (in the example proposed) A will be run through during a large number of clock pulses and the storage means B only contains a few groups. When the execution of A has been completed, the execution of B commences, at the same time as the groups in the next storage means, C, are stored, The storing of groups in the different storage means does not, of course, need to be carried out as sequentially as in the example in FIG. 4, in principle each storage means that is not being executed at the time can be "filled in" with information while execution of the groups in other storage means is being carried out, which means that the transmission of data from the ACU to the control device/storage means is very flexible, while at the same time the requirement for transmission capacity is reduced.

The ability to be able to switch flexibly and rapidly between several different functions for the antenna can, for example, be achieved according to the invention by controls (groups) for the different antenna functions being located in different storage means. For example, the storage means A in FIG. 3 could thus contain the controls that are required to achieve the function Tx in FIG. 1, the storage means B could contain the controls for the function $F_1$ in FIG. 1, and so on.

Figure 5:
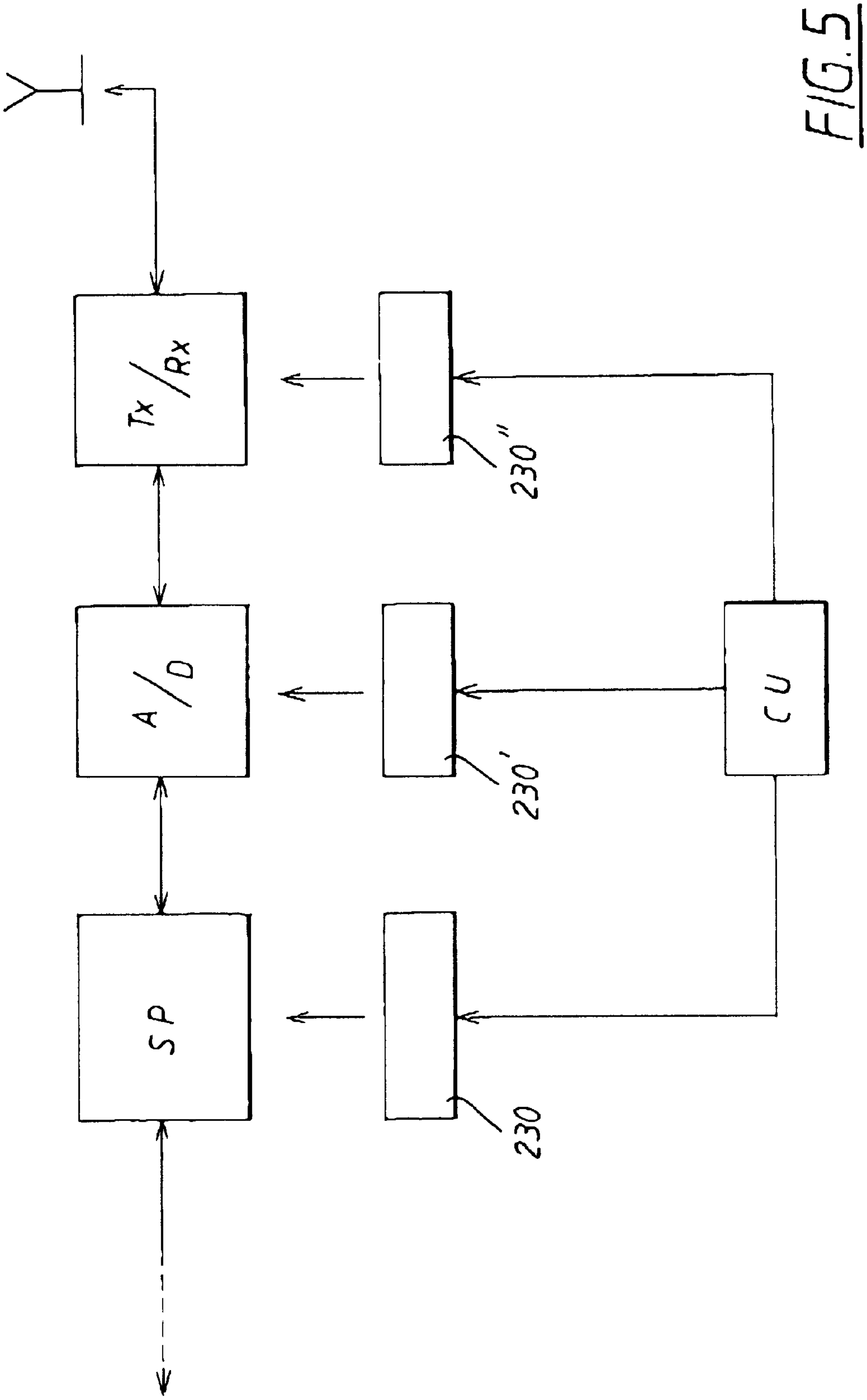
FIG. 5 shows an alternative use of a device according to the invention.

FIG. 5 shows another possible application of a control device 230 according to the invention. In order to simplify the control and to reduce the need for data transmission in real time in a large piece of equipment 500 for transmitting and receiving electromagnetic signals in the microwave range, for example a base station in a mobile telephony system or radar equipment, the control devices 230, 230', 230" according to the invention are used to control a plurality of subcomponents of the large piece of equipment, for example transmitter/receiver modules (Tx/Rx) in the antenna in accordance with what has been described above, and, for example, also signal processing (SP) and AID conversion (A/D: analogue to digital). A central unit (CU) in the large piece of equipment 500 controls the control devices 230, 230', 230" in the different subcomponents using control pulses and information transmission for storage means that are not being utilized at the time, in accordance with the principles that have been described above in connection with FIGS. 2 and 3, but with the difference that the information that is stored in the different groups in the storage means of the respective control device does not need to be the same. For example, as group 1 in the storage means A in the control device for an antenna module (Tx/Rx), there can be information about phase setting, amplification and additional functions in the module, while group 1 in the storage means A in the control device for the signal processing (SP) can contain information for different signal processing functions, for example lengths of FFTs (Fast Fourier Transforms) or information about constants that are to be used in various calculations.

The fact that several control devices according to the invention are utilized in this way, in order to control different subcomponents in a large piece of equipment, means that information that is stored in corresponding groups in the different storage means will be used at the same time. For example, as mentioned, a particular control of the antenna module can thus be linked to a particular signal processing function, and so on.

Figure 4:
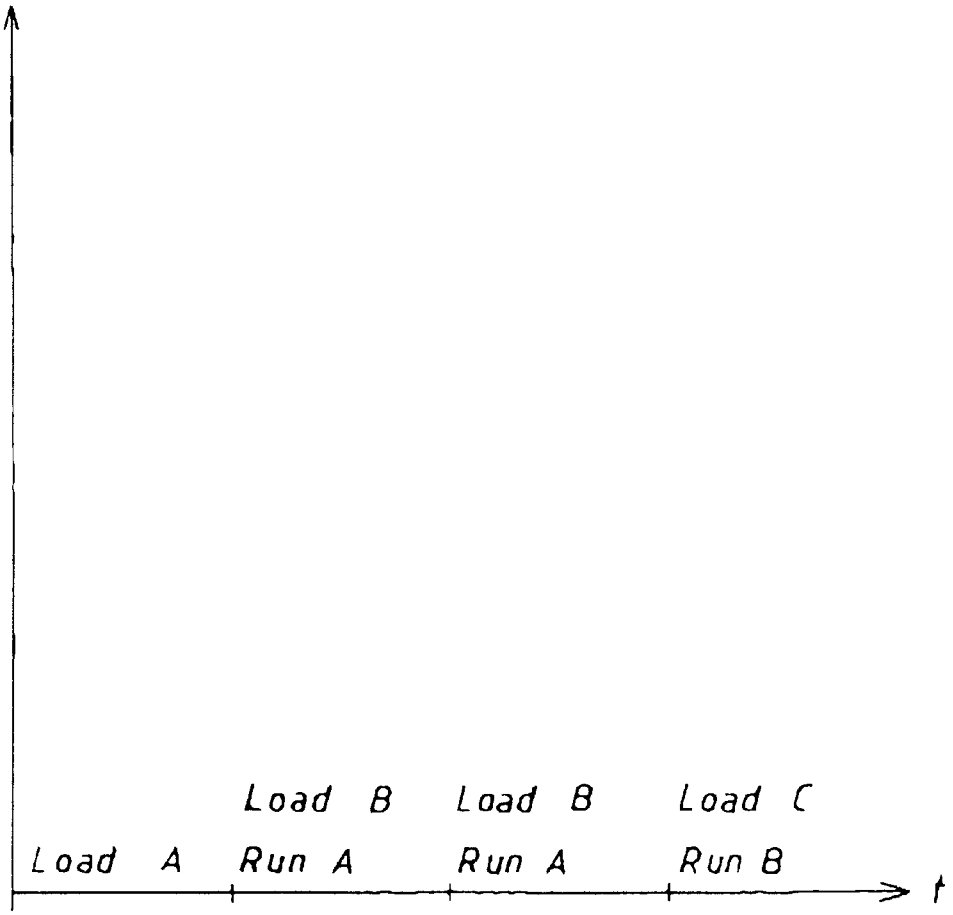
FIG. 4 shows the transmission of data to a control device according to the invention.

The central unit (CU) can thus control the different subcomponents in a simple way by controlling what information it stores in the different storage means. An alternative to the possibility shown in FIG. 4 is that each subcomponent has its own central unit (CU) which stores data in the respective control device's storage means. In this case, the central control unit should only need to provide control pulses, clock pulses, for the different local control devices.

An additional alternative is that one and the same storage means in each control device is reserved for a particular function. This would, for example, mean that storage means A in each control device was reserved for radar function, storage means B for communication, and so on. In this case, storage in the different storage means can also be carried out either from a central unit or from different local units.

The invention is not restricted to the embodiments described above, but can be varied freely within the framework of the following claims. For example, the generation of control pulses for storage means can be carried out locally in each control device instead of a central unit providing clock pulses/control pulses. It is also possible that the control pulses do not cause the groups to be processed sequentially, but instead the control pulses can contain information about which group in the storage means is to be used next.

What is claimed is:

1. Control device (230) for a subsystem (200) in a base station for mobile telephony, which subsystem can be set to different settings with regard to at least two different functions ($F_1$, Φ), the control system comprising means (320) for generating control pulses (Δt), characterized in that the control device comprises a plurality of storage means (A, B, C) which can be activated and controlled by the control device, in which storage means control information for the module's different functions is stored in different groups ($A_0$–$A_{NA}$, $B_0$–$B_{NA}$, $C_0$–$C_{NA}$) which can generate different states in the module, the storage means also containing information about the identity of each storage means, the number of times ($N_A$, $N_B$, $N_C$) that the states according to the groups in the storage means are to be assumed, and which storage means is to be activated thereafter.

2. Control device (230) according to claim 1, in which the information about the number of times ($N_A$, $N_B$, $N_C$) that the states according to the groups in a storage means (A, B, C) are to be assumed comprises information about the number of control pulses that the storage means is to use and the number of groups that are in the storage means.

3. Control device according to claim 1, in which the control pulses consist of clock pulses (Δt).

4. Control device (230) for a transmitter/receiver module (200) in an antenna for receiving and transmitting electromagnetic signals, which transmitter/receiver module can be set to different settings with regard to phase angle (Φ) of the transmitted/received signal and at least one additional transmission/reception function ($F_1$), which control device comprises means (320) for generating control pulses (Δt), characterized in that the control device comprises a plurality of storage means (A, B, C) which can be activated and controlled by the control device, in which means control information for the module's different functions is stored in different groups ($A_0$–$A_{NA}$, $B_0$–$B_{NA}$, $C_0$–$C_{NA}$) which can generate different states in the module, the storage means also containing information about the identity of each storage means, the number of times ($N_A$, $N_B$, $N_C$) that the states according to the groups in the storage means are to be assumed, and which storage means is to be activated thereafter.

5. Control device (230) according to claim 4, in which the information about the number of times ($N_A$, $N_B$, $N_C$) that the states according to the groups in a storage means (A, B, C) are to be assumed comprises information about the number of control pulses that the storage means is to use and the number of groups that are in the storage means.

6. Control device according to claim 4, in which the additional functions to which the transmitter/receiver module can be set comprise amplification and also transmission and reception.

7. Control device according to claim 5, in which the control pulses consist of clock pulses (Δt).

8. Method for controlling a subsystem (200) in a base station for mobile telephony, which subsystem can be set to different settings with regard to at least two different functions ($F_1$, Φ), which method comprises the generation of control pulses (Δt) for the subsystem, characterized in that the method comprises in addition storage of control information for the subsystem's different functions in different storage means, the information being stored in different groups which can generate different states in the subsystem, storage in each storage means of information about the identity of each storage means, the number of times that the states according to the groups in the storage means are to be assumed, and which storage means is to be activated after the storage means in question, and activation and control of one of the storage means.

9. Method according to claim 8, according to which method the information about the number of times that the states according to the groups in a storage means are to be assumed is calculated using information about the number of control pulses that the storage means is to use and the number of groups that are in the storage means.

10. Method for controlling a transmitter/receiver module (200) In an antenna for receiving and transmitting electromagnetic signals, which transmitter/receiver module can be set to different settings with regard to phase angle (Φ) of the transmitted/received signal and at least one additional transmission/reception function ($F_1$), which method comprises the generation of control pulses (Δt) for the module, characterized in that the method comprises in addition storage of control information for the module's different functions in different storage means, the information being stored in different groups which can generate different states in the module, storage in each storage means of information about the identity of each storage means, the number of times that the states according to the groups in the storage means are to be assumed, and which storage means is to be activated after the storage means in question, and activation and control of one of the storage means.

11. Method according to claim 10, according to which method the information about the number of times that the states according to the groups in the storage means are to be assumed is calculated using information about the number of control pulses that the storage means is to use and the number of groups that are in the storage means.

12. Method according to claim 10 in which the additional functions to which the transmitter/receiver module can be set comprise amplification and also transmission and reception.

13. Method according to claim 10, according to which the control pulses consist of clock pulses (Δt).

* * * * *